United States Patent
Braga Da Costa Campos

(10) Patent No.: US 6,705,547 B2
(45) Date of Patent: Mar. 16, 2004

(54) ACTIVE NOISE REDUCING NOZZLE

(76) Inventor: Luis Manuel Braga Da Costa Campos, Rua Rodrigo Da Fonseca 91-2ºDto., Lisboa (PT), 1250

( * ) Notice: Subject to any disclaimer, the term of this patent is extended or adjusted under 35 U.S.C. 154(b) by 72 days.

(21) Appl. No.: 10/060,808

(22) Filed: Feb. 1, 2002

(65) Prior Publication Data

US 2003/0146296 A1 Aug. 7, 2003

(51) Int. Cl.⁷ .............. B05B 12/00; F02K 3/02; F02K 1/18
(52) U.S. Cl. .............. 239/265.33; 239/265.19; 60/262; 181/215
(58) Field of Search .............. 181/215; 60/262, 60/264; 239/265.11, 265.17, 265.19, 265.33, 265.37

(56) References Cited

U.S. PATENT DOCUMENTS

| | | | | |
|---|---|---|---|---|
| 2,934,889 A | * | 5/1960 | Poulos | 239/265.11 |
| 3,618,701 A | * | 11/1971 | Macdonald | 181/221 |
| 4,068,469 A | * | 1/1978 | Adamson | 60/204 |
| 6,082,635 A | * | 7/2000 | Seiner et al. | 239/265.19 |
| 6,308,898 B1 | * | 10/2001 | Dorris et al. | 239/265.17 |
| 6,571,549 B1 | * | 6/2003 | Stanek | 60/262 |
| 2002/0125340 A1 | * | 9/2002 | Birch et al. | 239/265.11 |
| 2002/0189896 A1 | * | 12/2002 | Tse | 181/213 |

* cited by examiner

Primary Examiner—Charles G. Freay

(57) ABSTRACT

A nozzle where the sector into which noise reduction is sought (the direction of populated areas) has a moving lip, driven by actuators in an oscillatory, periodic or sinusoidal motion, around the mid position, to and from the axis, so as to cause the shear layer to become more irregular and turbulent, thus enhancing scattering effects on the sound of internal sources, including back reflection into the jet, widening the directivity pattern and spreading the acoustic energy into a broader spectrum, so as to reduce the acoustic energy transmitted in these sensitive directions; the nozzle lip may also be corrugated, undulated or have vortex generators, in the sector over which noise reduction is sought. In all other sectors, for which noise radiation is of no concern, even if enhanced, the nozzle lip is smooth and fixed, leading to a thin shear layer, across which sound is more easily, so that acoustic energy exits from the jet in these harmless directions. The active nozzle need only be actuated at times when noise reduction is needed, e.g. a take-off and landing; at all other times, when noise reduction is not needed, e.g. in cruise flight, the nozzle is not active, i.e. is fixed in the mid-position, to save actuator power, and wear and fatigue of moving mechanisms; also, this position, minimizes any thrust loss or increase in fuel consumption, in cruise flight.

4 Claims, 9 Drawing Sheets

PRIOR ART

PRIOR ART

ACTIVE NOISE REDUCING NOZZLE

SCIENTIFIC BACKGROUND

The present patent concerns a nozzle design which reduces jet exhaust noise. Among the sources of noise of turbojet and turbofan engines, that corresponding to the jet exhaust is one of the most important. The jet exhausts into the atmosphere, where ambient air moves at much lower speed, particularly in low-speed flight phases, like take-off and landing; these flight phases are of most concern regarding noise around airports, and are subject to ICAO (International Civil Aviation Organisation) noise certification rules, as well as additional restrictions at some airports.

The jet exhausting into ambient air forms a shear layer, across which the velocity changes from the jet speed to the ambient speed. The noise from sources inside the jet is transmitted to the exterior across this shear layer, and this process can change the intensity, directivity and spectrum of sound, thereby reducing the noise disturbance outside. In the case of a turbofan, there are two co-axial jets, and thus two shear layers; the noise from sources in the inner jet is transmitted to the exterior across two shear layers, with possible multiple internal reflections, leading to greater scattering effects and lower noise. The various mechanisms of noise reduction are explained next, by starting with simple models of the shear layer, and elaborating them step-by-step, until close similarity to a real shear layer is achieved.

The simplest model is a vortex sheet, i.e. a surface across which the velocity changes abruptly from the jet speed to the ambient speed. This model would apply if the wavelength of sound was much larger than the thickness of the shear layer, and the scale of irregularities of the shear layer and if no turbulence were entrained with the shear layer. All these restrictions will be removed later. Staying for the moment with a plane vortex sheet, it is clear that a sound source inside the jet will emit an acoustic wave, incident upon the vortex sheet, giving rise to reflected and transmitted waves. The existence of a reflected wave, means that not all acoustic energy is transmitted across the shear layer, so there is a reduction in acoustic intensity outside the jet. The transmitted wave is not radiated in all directions, i.e. there is a 'zone of silence' outside the jet, where there are only evanescent waves. Thus the transmitted sound field has a reduced intensity compared to the direct sound field of the source, and also a modified directivity pattern including one "zone of silence" or two (the latter for jet Mach numbers exceeding two).

Let's elaborate the model a little more, and assume that the vortex sheet is not flat but rather is irregular. This will apply if the wavelength is still much larger than the thickness of the shear layer but is not much larger than the scale of its irregularities; for the moment, turbulence or eddies entrained with the shear layer are not considered yet. The incident sound wave originating from the source now hits the irregular vortex sheet at different heights, and gives rise locally to reflected and transmitted waves. Since these waves are no longer in phase, there can be destructive interference in the transmitted sound field, reducing the noise level outside the jet, compared with a flat vortex sheet between the same media. Also, the irregular vortex sheet can transmit sound into what would be the 'zone of silence' of a flat vortex sheet, because local scattering conditions may allow this; thus the transmitted acoustic energy is spread over a wider range of directions, by an irregular vortex sheet, as compared with a flat vortex sheet, further modifying the directivity, and reducing the intensity of radiation.

It should be borne in mind that the irregular vortex sheet separating the jet from ambient moves at a convection velocity intermediate between the two. When sound is scattered from a moving surface, its frequency is changed by the Doppler effect. Besides the Doppler shifted frequency of the source, harmonics at other frequencies may appear. Thus a moving, irregular vortex sheet further reduces the noise relative to a static irregular vortex sheet, also because the acoustic energy is spread over more frequencies.

So far it has been assumed that the moving irregular vortex sheet representing the shear layer has a fixed shape; actually, real jet shear layers are turbulent, and thus should be represented by a randomly irregular moving vortex sheet if the wavelength is very large compared with the thickness of the shear layer. This vortex sheet with randomly changing shape causes random changes in the direction of the transmitted wave, and thus scatters sound over a wider range of directions and causes more interference between wave components, also a randomly irregular moving vortex sheets causes random Doppler shifts, thus spreading the acoustic energy over a wider spectrum. The three effects, viz:(i) more interference between wave components, (ii) wider directivity pattern and (iii) broader spectrum, all contribute to reduce the acoustic intensity received on average on each direction and the each frequency outside the jet.

It is appropriate to introduce at this stage the spectral directivity $I(\theta,\phi,\omega)$ defined as the acoustic power $dW$ received per unit frequency $d\omega$ and unit solid angle $d\Omega$ $$dW = I(\theta,\phi,\omega)d\Omega,$$

where the solid angle $d\Omega$ is expressed in terms of spherical coordinates $(\theta,\phi)$ by:

$$d\Omega = \sin\theta d\theta d\phi.$$

It has already been explained why a randomly irregular moving vortex sheet reduces the spectral directivity and total acoustic power received from the source. The explanation has been based on three scattering effects: (i) wave interference; (ii) wider directivity pattern; (iii) spectral broadening. These effects have been demonstrated for scattering by a randomly irregular moving interface, which is an adequate model of a shear layer if the wavelength is much larger than the thickness of the shear layer. We shall now lift this last remaining restriction.

For sound of arbitrary, i.e. smaller wavelength, the shear layer no longer appears as a discontinuity of velocity between the jet and ambient medium, but rather as a smooth velocity change or shear flow. The transmission of sound through this shear flow demonstrates scattering effects, like for a vortex sheet, with the additional possibility of sound absorption by the flow, at critical points where the Doppler shifted frequency vanishes. This is a further noise reducing mechanism.

A real shear layer is not only a shear flow, but also entrains turbulence and eddies. The effects of turbulence and eddies on the scattering of sound are similar to those of a randomly irregular moving interface, in the sense that: (i) there is backscattering, i.e. some of the acoustic energy is scattered back into the jet, and thus does not reach the ambient medium; (ii) there is a wider directivity pattern, because sound is deflected into directions which might not be present in the incident wave; (iii) there is spectral broadening, because the convection of sound by turbulence and eddies causes random Doppler shifts; (iv) the changes in direction of propagation and frequency cause interference between sound waves. The ensemble of four effects (i) to (iv), plus possible (v) sound absorption at critical layers is called "scattering effects" in what follows. It is clear that these scattering effects reduce the noise transmission from a jet to the exterior.

BRIEF DESCRIPTION OF THE DRAWINGS

FIG. 1 represents the noise sources of a turbojet engine, as concerns the transmission of sound from the interior of the jet to the ambient across the shear layer. FIG. 2 concerns the case of turbofan engines, when there is a hot high-speed core jet with burned gases, surrounded by a cooler, lower-speed by-pass flow of air, and thus there are two concentric shear layers: (i) and inner shear layer between the core jet and the by-pass flow; (ii) an outer shear layer between the by-pass flow and the ambient atmosphere. The hot, high-speed core jet is the noisiest, but sound from sources in the core jet has to be transmitted across two shear layers to be received outside, thus increasing "scattering effects". The sound from sources in the by-pass flow has to be transmitted only across one shear layer, but the sources are weaker than in the core jet. There can be multiple internal reflections between the two shear layers; (i) for sound from sources in the by-pass flow; (ii) for sound from sources in the core jet, transmitted across the inner shear layer to the by-pass flow. All these mechanisms enhance the "scattering effects" in a turbofan exhaust, compared with a turbojet, and help to explain its lower noise levels.

DETAILED DESCRIPTION OF THE INVENTION

The noise of exhaust jets can be reduced by enhancing the "scattering effects" of the shear layer issuing from the nozzle lip, by making it more irregular in two ways:
 (A) by having a corrugated or undulated nozzle;
 (B) by having the nozzle lip move in an oscillatory manner driven by actuators.

The option (A) is what may be called a "passive" nozzle; several patents have suggested "passive" nozzles with lobes and corrugations. We will propose some novel improvements. The option (B) may be called a "active" noise-reducing nozzle, and is an entirely new feature of the present patent. We will consider the "scattering effects" of current "passive" nozzles, before proceeding to "improved passive nozzles" and "active nozzles".

Figure 1:
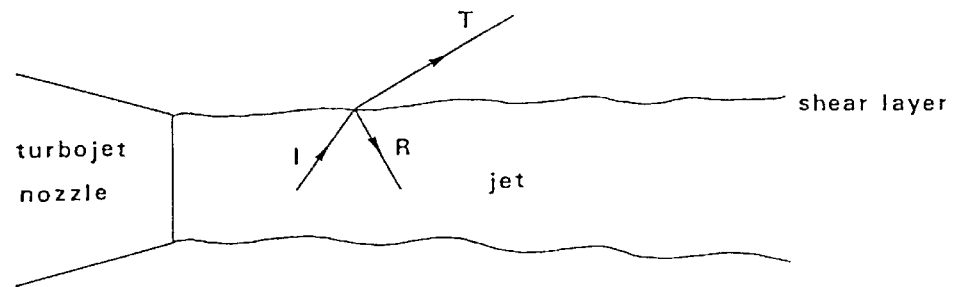
FIG. 1 represents the noise sources of a turbojet engine.
Figure 2:
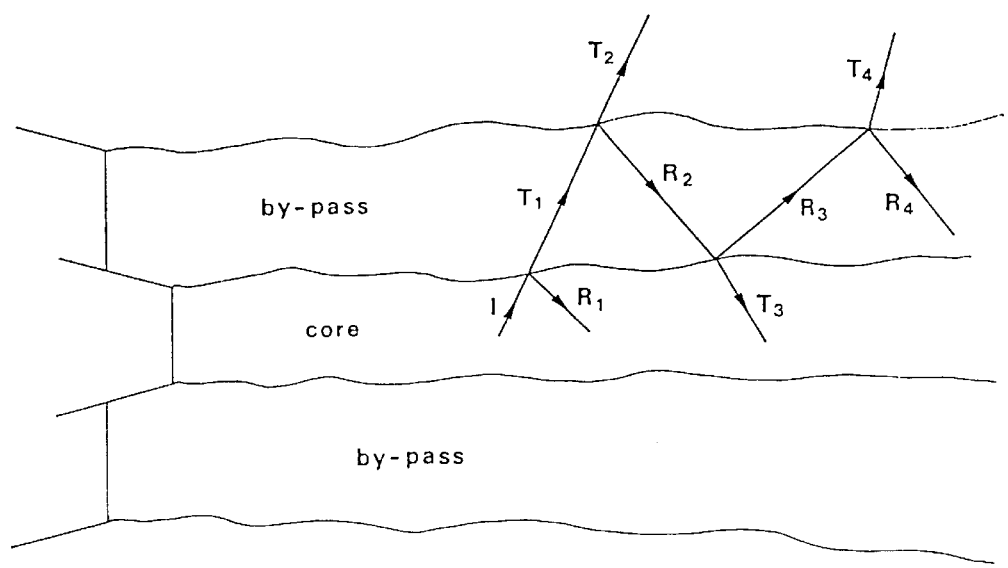
FIG. 2 represents the noise sources of a turbofan engine.
Figure 3:
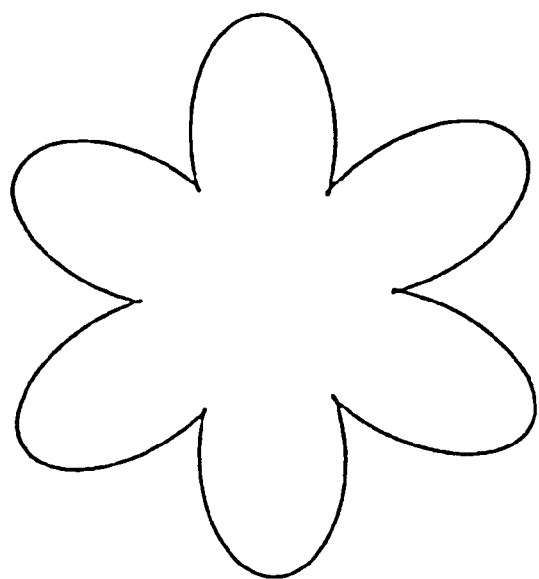
FIGS. 3 and 4 show prior art passive exhaust nozzles.

FIG. 3 shows a type of passive nozzle in use for several decades, is the multi-lobe ejector nozzle. The lobes reduce the maximum size of eddies in the jet, thus reducing noise. They also produce a more irregular shear layer, which enhances scattering effects, and thus reduces sound transmission to the exterior of the jet. The multi-lobe ejector nozzle is acted by a force due to the jet, and thus reduces thrust. For the same fuel burn, a lower thrust means higher specific fuel consumption. Note that the penalties of thrust loss and increased fuel consumption apply to all flight phases, including cruise; the noise reduction is needed when flying near an airport, i.e. only at take-off and landing.

Figure 4:
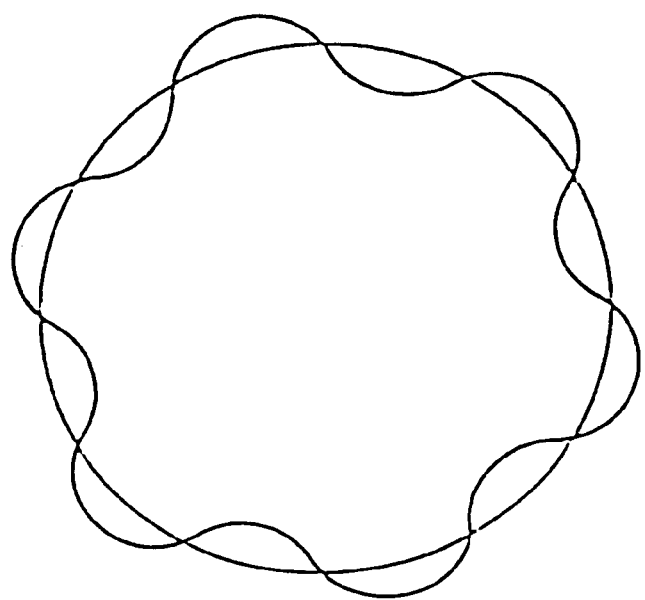

FIG. 4 shows another type of passive nozzle (FIG. 4) known as 'chevron' nozzle, which, has undulations, or corrugations, or vortex generators around its circumference. It does not reduce significantly the size of the largest eddies in the jet, and has a lesser negative effect on thrust and fuel consumption than the multi-lobe nozzle. It does produce a more irregular shear layer than the nozzle with a smooth lip, and thus increases scattering effects and reduces sound transmission to the exterior of the jet. It should be noted that the vortices shed by the nozzle are noise sources, and thus radiate sound, besides scattering sound from sources inside the jet.

Figure 5:
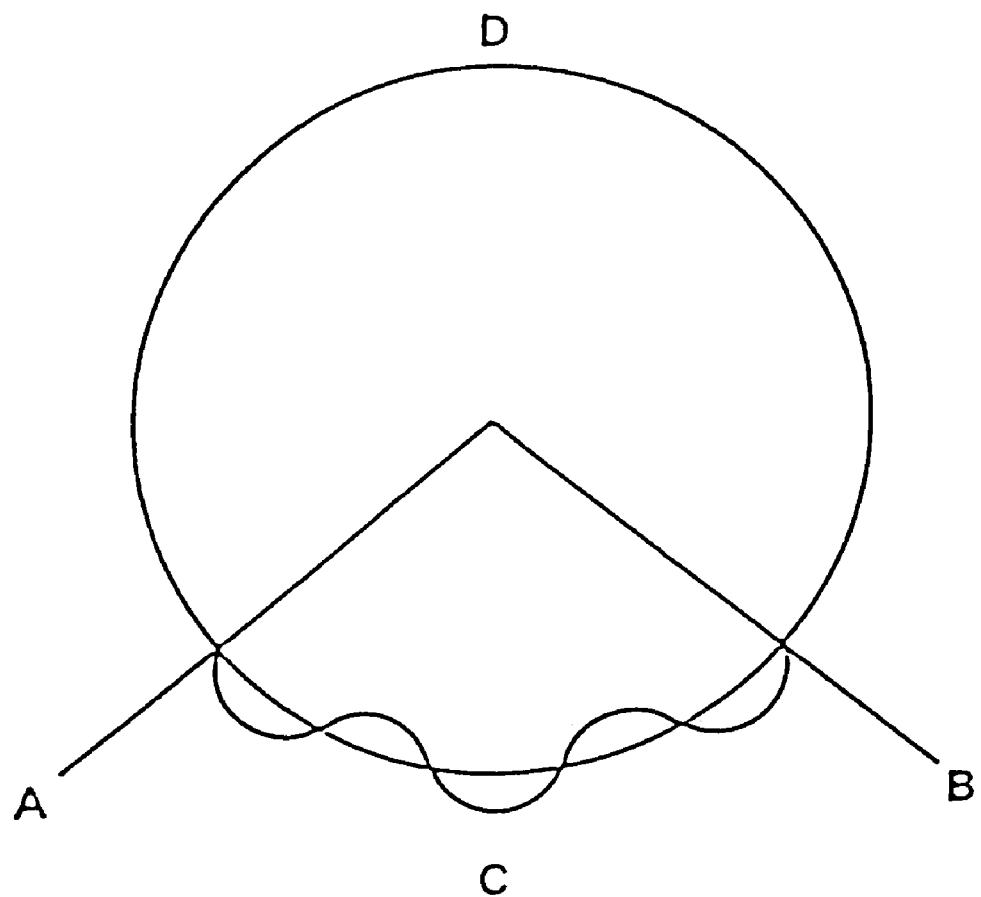
FIG. 5 shows an improved passive nozzle according to one embodiment of the invention.

In many applications, it is not necessary to reduce noise transmission in all directions, but only some. For example, the ICAO noise certification rules concern only 'fly over' and 'side line' noise for the take-off and landing phases of flight. Thus it is important to reduce sound transmission in a sector downwards, and it is only in this sector that nozzle lip treatment is needed as shown in FIG. 5, to produce a more irregular shear layer, and increase scattering effect. The "improved passive" nozzle, with non-aximometric lip treatment only in the downward sector ACB, which is shown in FIG. 5, is an advance over the nozzle shown in FIG. 4 with treatment over the whole periphery, for several reasons:
 it allows sound to be transmitted more easily out of the jet into the 'harmless' directions in the upward sector $\overline{ADR}$, reducing the acoustic energy in the jet;
 it is equally effective in reducing sound transmission in the sector $\overline{ACB}$ where the noise disturbance should be avoided.

The combination of less acoustic energy in the jet, and equally effective scattering in the sector $\overline{ACB}$, results in less sound transmission for "the improved passive" nozzle with sectorial lip treatment shown in FIG. 5 than for conventional passive nozzle shown in FIG. 4. This passive nozzle with sectorial lip treatment is an innovation of the present patent. It is more effective at noise reduction than the conventional nozzle, and besides, it is simpler and cheaper to build because lip treatment is applied only over part of the circumference; for the same reason it is also lighter, and affects less thrust and fuel consumption.

Figure 6:
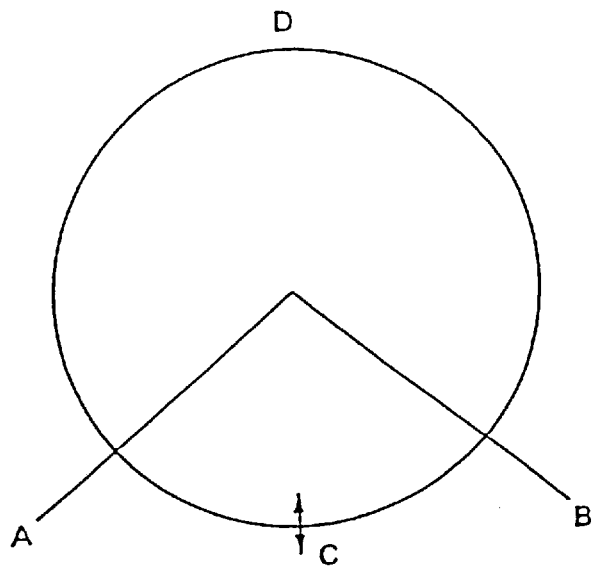
FIG. 6 discloses an active nozzle with an oscillating lip.

So far consideration has been given only to passive nozzles, with lip treatment. Another way to increase the irregularity of the shear layer, and thus increase scattering effects and reduce sound transmission, is shown in FIG. 6 where the nozzle lip can oscillate up-and-down, e.g. periodically or sinusoidally, driven by activators. This "active nozzle" need only have a moving lip over the arc $\overline{ACB}$ of directions for which noise reduction is sought. The "active" nozzle has the advantadge that the moving lip need be actuated only during the take-off and landing phases of flight, when noise reduction is sought. During other phases of flight, e.g. cruise, the nozzle lip is kept fixed in the normal position, saving actuator power. This cruise configuration is similar to a fixed nozzle, so there are no penalties on thrust loss or fuel consumption.

Figure 7:
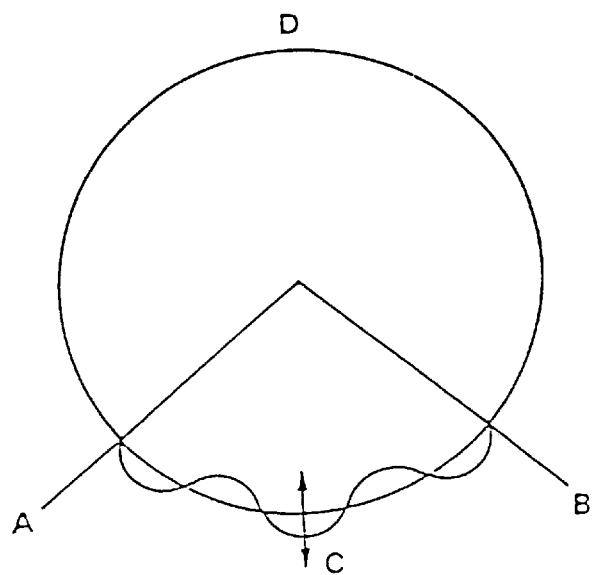
FIGS. 7 and 8 show an oscillating corrugated exhaust lip.
Figure 8:
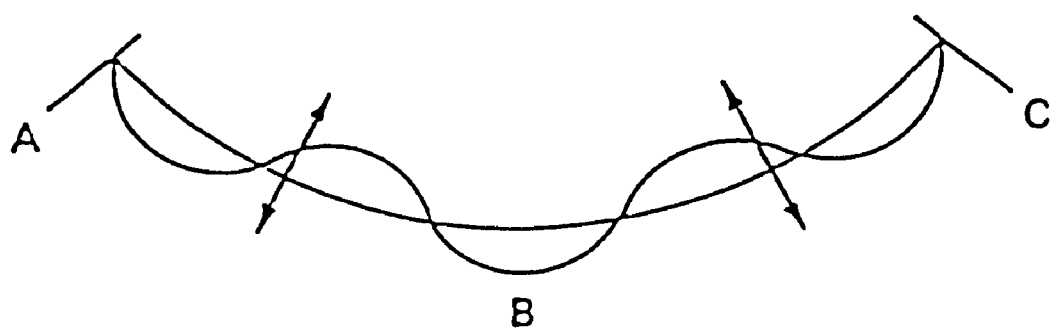

The "active nozzle", or nozzle with a moving lip, may have either a smooth lip as shown on FIG. 6 or a corrugated lip as shown an FIG. 7. If a corrugated lip is chosen as shown in FIG. 8, then the sound scattering effect is enhanced, since both the corrugated lip and the lip motion contribute to make the shear layer more irregular, in the take-off and landing phases; in the cruise phase, with lip motions deactivated, the corrugated lip section still may affect thrust and fuel consumption.

If the nozzle lip is smooth as shown in FIG. 6, then in cruise flight, with fixed lip, there is no thrust loss or increase in fuel consumption; at take-off and landing, the lip motion will enhance scattering effects and reduce sound transmission. If this noise reduction is enough, then the active nozzle with smooth lips is the best solution because:

it has no effect on cruise thrust or fuel consumption;

actuation is needed only in the take-off and landing phases of flight, reducing power requirements, structural fatigue of moving parts, etc.

the moving lip needed only be over the sector ('flyover' and 'sideline') where noise reduction is sought.

This type of nozzle is the simplest solution, because it produces a more irregular shear layer only when needed (at take-off and landing) and in the directions sought (to reduce the noise disturbance in the fly-over and sideline positions around the airport).

Figure 9:
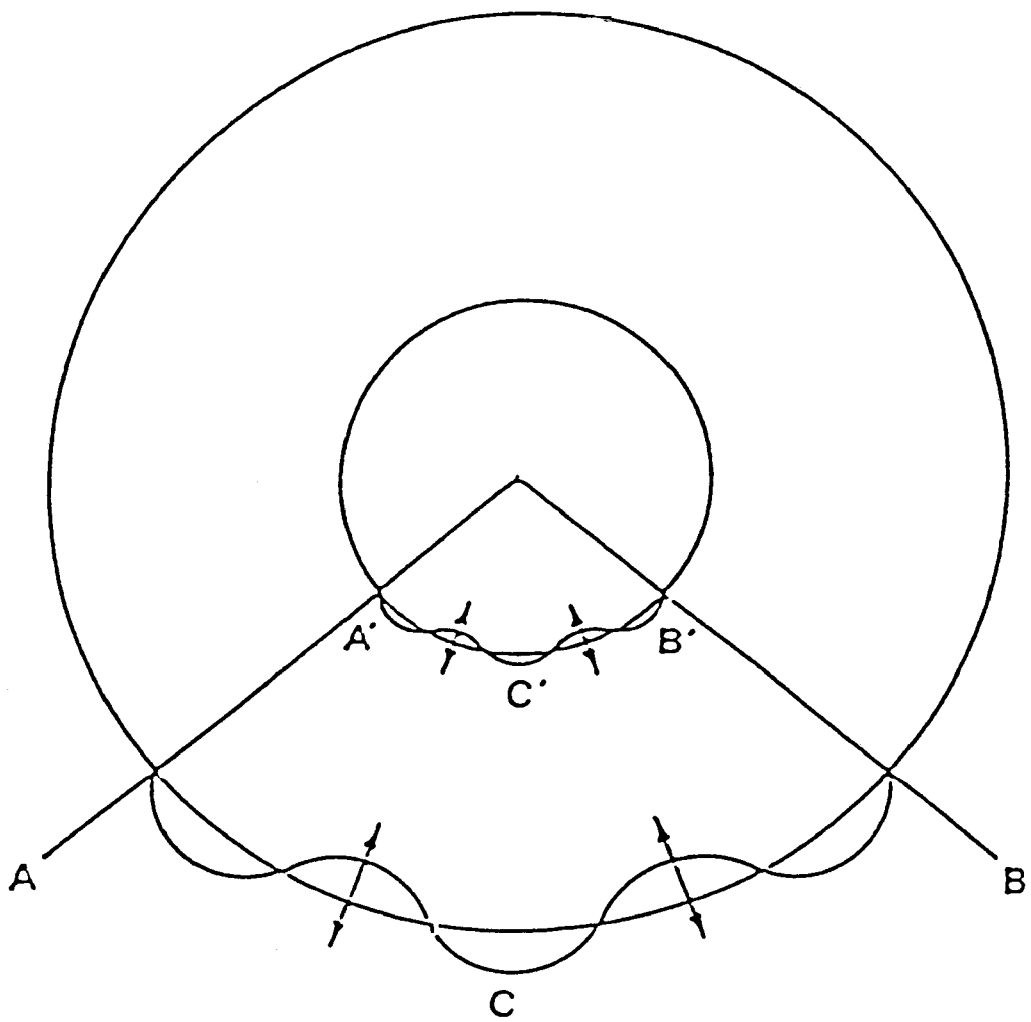
FIG. 9 represents a turbofan engine with concentric or ovalized nozzles for the core and by-pass flows.
Figure 10:
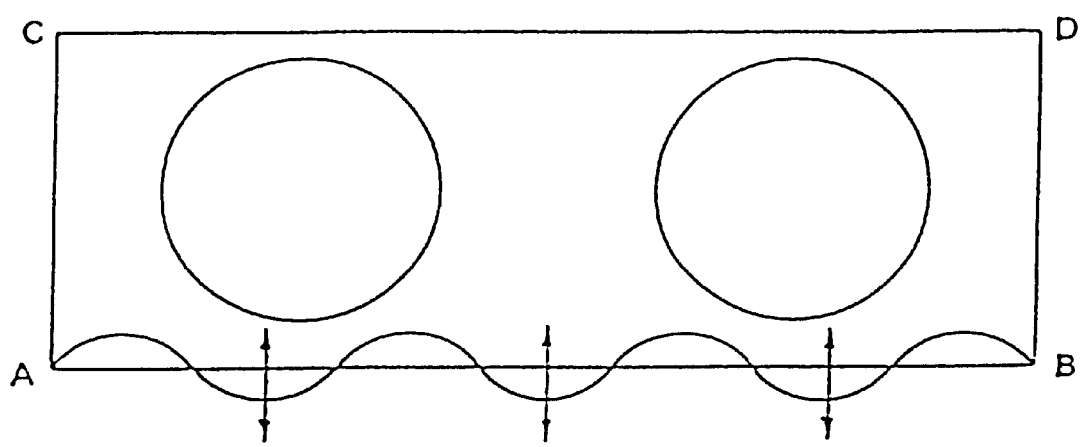
FIG. 10 shows two or more engines in a nacelle with a rectangular nozzle.

The same kind of noise reduction methods can be applied to other nozzle geometries. Consider a jet issuing from a nozzle, which may be circular as shown in FIG. 9, rectangular as shown in FIG. 10, or any other shape. Consider the sector $\overline{ABC}$ shown in FIG. 8 comprising the direction of populated areas, where noise reduction is sought. Assume that all other directions are not populated, so there is no need to reduce noise in those directions, and no harm in re-directing some of the acoustic energy in those directions. Then the lip of the nozzle over this sector will be made to move, to and from the axis, in an oscillatory, periodic or sinusoidal more, by using appropriate actuators, and dividing the lip into sections with joints as necessary. The resulting more irregular shear layer will enhance scattering effects, and reduce sound transmission into the directions where noise reduction is sought.

The nozzle lip will be actuated only at those times or stages of flight when noise reduction is sought, e.g. take-off and landing, to reduce the noise disturbance around airports. At all other times or stages of flight, e.g. cruise, the nozzle lip is not actuated, saving power and avoiding structural fatigue of moving components.

If the nozzle lip is smooth, then in the fixed 'cruise' position the nozzle shape is unchanged, and there is no thrust loss or increase in fuel consumption. The moving section of the nozzle lip may also be corrugated, to increase further the scattering effects and provide greater noise reduction. In the case of turbofan (FIG. 9) the sectors of the nozzle periphery which are (i) "active" or actuated and (ii) passive but corrugated, may coincide or not. Also one lip could be "active" and the other "passive", and either could be smooth or corrugated, in any combination.

Preferred Embodiments

Three embodiments will be described: (i) a jet engine with circular nozzle; (ii) a turbofan engine with two co-axial circular nozzles; (iii) two or more engines with a common rectangular nozzle.

The first embodiment is a jet engine with a circular or ovalized nozzle (FIGS. 6 and 7). The sector corresponding to populated areas around the airport is $\overline{ACB}$. For the "active noise-reducing" nozzle this sector moves to and fro the axis, driven in an oscillatory, or periodic or sinusoidal manner by actuators; the sector $\overline{ACB}$ may also be divided into 'petals' or 'sections' with appropriate hinges. The actuators are powered only during the phases of flight when noise reduction is sought, e.g. take-off, landing and possibly initial climb and final descent. The sector $\overline{ACB}$ of the nozzle lip could have or not as shown in FIG. 8, corrugations, undulations or vortex generators, to enhance scattering effects further and reduce more the sound transmission. The same methods could be used in other sectors, e.g. to reduce noise radiation from the engines to the cabin in cruise flight.

The second embodiment concerns a turbofan engine as shown in FIG. 9 with concentric circular or ovalized nozzles for the core jet and by-pass flow. The sectors for noise reduction could be the same or different for the by-pass flow $\overline{ACB}$ and core jet $\overline{A'C'B'}$. The nozzle of the by-pass flow should be 'active' at the stages of flight requiring noise reduction, to reduce transmission of sound from both the by-pass flow and core jet; it could have lip corrugations or not. The nozzle of the core jet could be "passive" or "active" and be smooth or corrugated. Thus there would be plenty of scope for trade-offs among noise reduction, complexity and weight, thrust and fuel consumption penalties. Two active nozzles both with corrugated lips would give the greatest noise reduction and also the biggest penalty in complexity, weight, thrust and fuel consumption. These penalties would be reduced by going for smooth lips and making only one nozzle active, say the outer nozzle whose shear layer scatters both core jet and by-pass flow noise.

The third embodiment concerns two or more engines in a nacelle with a rectangular nozzle as shown in FIG. 10. It may be assumed that the lower lip AB will be "active" and may or may not have corrugations, to reduce 'fly-over' nozzle. The upper lip $\overline{CD}$ will be smooth and fixed, since there is no need to reduce sound transmission upwards, and there is no harm even in increasing it, to reduce the acoustic energy in the jet. The side panels $\overline{CA}$ and $\overline{DB}$ may be passive or active, and may be smooth or corrugated, depending on the need or not for noise reduction. For example, if the fuselage is on the side $\overline{CA}$ an active and/or corrugated panel would reduce aerial (as distinct from structural) transmission of sound from the engine to the cabin; if the panel $\overline{DB}$ lies in a sector of 'sideline' noise, it may need to be active and/or corrugated, to reduce side-line noise. In cruise flight, the panels $\overline{AB}$ and $\overline{BD}$ would become passive, but $\overline{AC}$ could remain active if cabin noise reduction was an issue.

The three embodiments described concern aircraft applications. However, similar ideas apply to other jet exhaust installations, e.g. in ships, power plants, land vehicles, industrial installations, etc. In all these cases an active nozzle lip, with or without corrugations, may be used to reduce sound transmission in directions where noise reduction is sought; a passive and smooth nozzle lip is used in all other directions. The "active" nozzle is used only at times when noise reduction is needed, e.g. at night, and is switched-off to save power and wear at other times.

Figure 11:
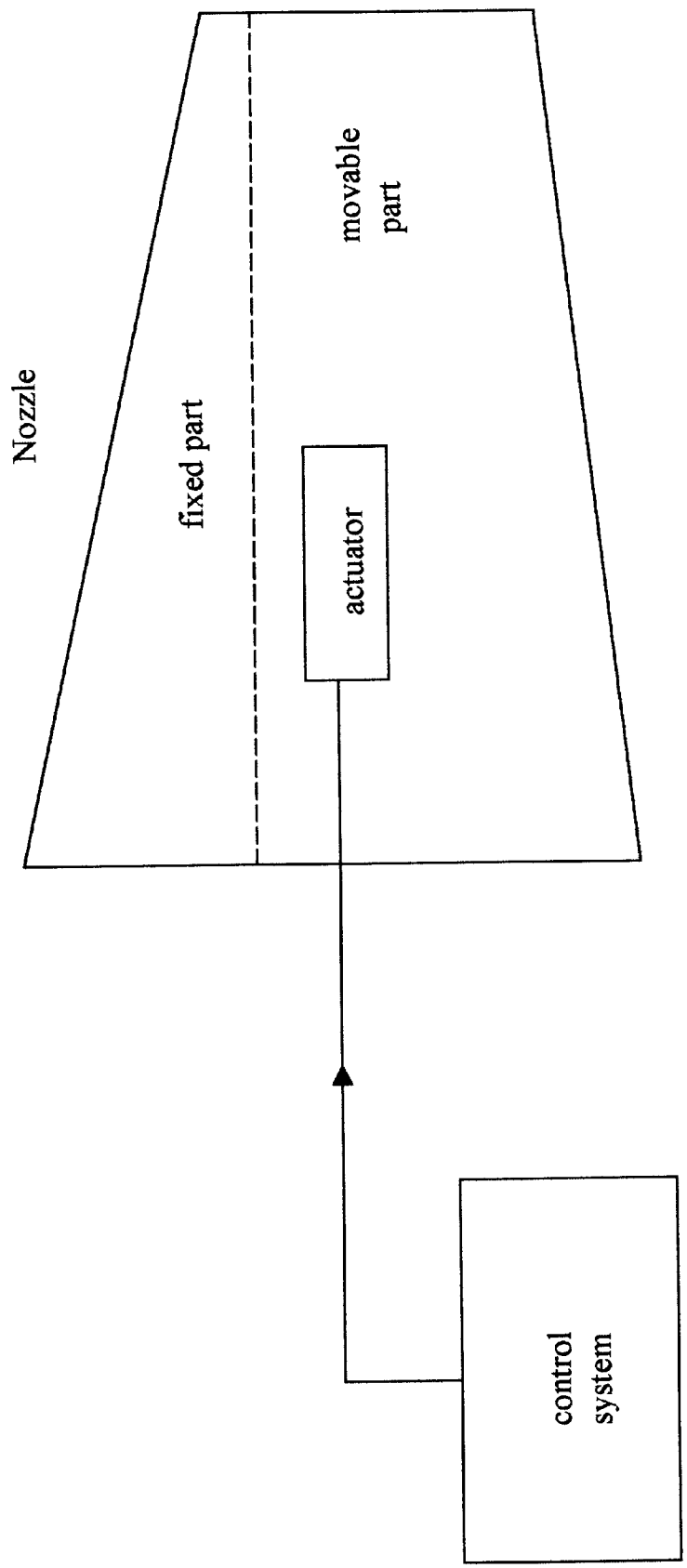
FIG. 11 is a side view showing the control system/nozzle actuator of FIG. 7.

From the point-of-view of construction, a "improved passive" nozzle with lip treatment only over a fraction of the periphery, would be built like a conventional passive nozzle, with similar lip undulations or vortex generators. An "active" nozzle requires that the part of the periphery of the nozzle used for noise reduction be movable to and from the axis, either as a single piece or a set of segments or petals e.g., as already used in variable-area and thrust-vectoring nozzles. In a similar way, actuators would be used to drive the moving elements of the active nozzle; the alternative would be to leave the moving elements in free motion. In the latter case, the free motion of the nozzle elements would be determined by the aerodynamic forces around the nozzle. In order to give the moving elements of the active nozzle a prescribed motion, optimized to maximize noise reduction, the actuators would be commanded by a control system. The control laws used could be either calculated for the flight conditions, or be based on sensor signals or combination of both. The FIG. 11 shows a side-view of the nozzle seen from behind in FIG. 7, and includes a block-diagram including the control system, nozzle actuator and moving lip section.

What is claimed:

1. An active exhaust nozzle for a gas turbine engine comprising a primary exhaust nozzle having a central axis and an exit end;

the exit end having two sectors, a first noise reducing sector and a second noise transmission sector;

the noise reducing sector being formed by a hinged section which allows a lip of the section, located at the exit end, to oscillate towards and away from the central axis;

an active noise reduction means for actuating the hinged section of the first noise reducing sector to make the exhaust shear layer irregular and turbulent, thus scattering parts of the sound from sources inside the gas turbine engine and spreading the sound to a range of directions corresponding to the noise transmission sector, over a wide range of frequencies; and, a controller for actuating the active noise reduction means during operation when reduced noise is required in the direction defined by the noise reducing section.

2. The active exhaust nozzle for a gas turbine engine according to claim 1, wherein the noise reducing sector has corrugations, undulations or vortex generators.

3. The active exhaust nozzle for a gas turbine engine according to claim 1, wherein the lip of the noise reducing sector is smooth.

4. The active exhaust nozzle for a gas turbine engine according to claim 1, wherein the noise transmission sector has exit lip, which is smooth.

* * * * *